US008649780B1

(12) United States Patent
Oh et al.

(10) Patent No.: US 8,649,780 B1
(45) Date of Patent: Feb. 11, 2014

(54) WIRELESS COMMUNICATION DEVICE WITH AUDIO/TEXT INTERFACE

(75) Inventors: DaeSik Oh, Overland Park, KS (US); Dennis Allan Selznick, Overland Park, KS (US); Brent Allen Burpee, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1755 days.

(21) Appl. No.: 12/013,053

(22) Filed: Jan. 11, 2008

(51) Int. Cl.
*H04L 29/08* (2006.01)

(52) U.S. Cl.
USPC ............... 455/414.4; 455/466; 455/414.1; 455/566

(58) Field of Classification Search
USPC .............. 370/352; 379/52; 455/414.4, 414.1, 455/466, 566
See application file for complete search history.

(56) References Cited

U.S. PATENT DOCUMENTS

| | | | |
|---|---|---|---|
| 6,205,339 B1 | 3/2001 | Leung et al. | |
| 6,987,850 B1 | 1/2006 | Watson | |
| 7,200,208 B2 * | 4/2007 | Smith et al. | 379/52 |
| 7,236,574 B2 * | 6/2007 | Haldeman et al. | 379/52 |
| 7,649,877 B2 * | 1/2010 | Vieri et al. | 370/352 |
| 2002/0069069 A1 * | 6/2002 | Kanevsky et al. | 704/271 |
| 2004/0012643 A1 * | 1/2004 | August et al. | 345/865 |
| 2006/0140353 A1 * | 6/2006 | Jung | 379/52 |

* cited by examiner

*Primary Examiner* — Kiet Doan
*Assistant Examiner* — Dung Lam

(57) ABSTRACT

A wireless communication device is configured to visually prompt a user to initiate a text session, and to receive a text session request from the user including a called number. In response to the text session request, the device initiates the text session by placing a first call to a service node using a service node number, and transfers the called number to the service node over the first call. The service node then extends the text session by placing a second call to the called number. Once the text session is established, the device sends a first text message to the service node over the first call, and receives a second text message from the service node over the first call. The device then visually displays the second text message to the user.

22 Claims, 10 Drawing Sheets

WIRELESS COMMUNICATION DEVICE WITH AUDIO/TEXT INTERFACE

OVERVIEW

Historically telephone systems have been designed for audio communication. This requires hearing impaired users to find ways to interface textually with an audio-based system with mixed results. For example, captioning centers allow the hearing impaired to textually interface with an operator who then establishes a connection with a called party and reads text messages from the hearing impaired user to the called party and, in response, types messages from the called party back to the hearing impaired user. Many current wireless phone devices are capable of text messaging with other wireless phone devices. Such wireless telephones have not been effectively integrated with captioning centers to allow an effective audio/text interface.

TECHNICAL SUMMARY

A wireless communication device is configured to visually prompt a user to initiate a text session, and to receive a text session request from the user including a called number. In response to the text session request, the device initiates the text session by placing a first call to a service node using a service node number, and transfers the called number to the service node over the first call. The service node then extends the text session by placing a second call to the called number. Once the text session is established, the device sends a first text message to the service node over the first call, and receives a second text message from the service node over the first call. The device then visually displays the second text message to the user.

In another embodiment, a wireless communication device receives a first call from a calling communication device, visually prompts a user to request a text session, and receives a text session request from the user. In response to the text session request from the user, the device initiates the text session by placing a second call to a service node using a service node number. The service node then extends the text session by placing a third call to the wireless communication device. The device then receives a first audio message from the calling communication device over the first call, and transmits the first audio message to the service node over the second call. The device then receives a first text message from the service node over the third call, and visually displays the first text message to the user. In response to receiving a second text message from the user, the device transmits a second text message to the service node over the third call, receives a second audio message from the service node over the second call, and transmits the second audio message to the calling communication device over the first call.

In a further embodiment a wireless communication device comprises a communication interface, configured to wirelessly couple the wireless communication device to a communication network including a service node, a user interface including a display, and a processor coupled to the communication interface and the user interface. The display is configured to visually prompt a user to request a text session. The user interface is configured to receive a request for a text session and a called number from the user, and output the request for a text session and the called number to the processor. The processor is configured to connect to a service node through the communication interface in a first call, signal the service node that a text session is requested, transmit the called number to the service node through the communication interface over the first call, and complete a text session to the called number through the service node. The wireless communication device sends a first text message to the service node over the first call, receives a second text message from the service node over the first call, and visually displays the second text message to the user.

In another embodiment a wireless communication device comprises a communication interface, configured to wirelessly couple the wireless communication device to a communication network including a service node, a user interface including a display, and a processor coupled to the communication interface and the user interface. The communication interface is also configured to receive a first call from a calling communication device. The display is configured to notify a user that a first call is waiting, and visually prompt a user to request a text session. The user interface is configured to receive a request for a text session from the user, and output the request for a text session to the processor. The processor is configured to select a service node within the communication network, connect to the service node through the communication interface in a second call, signal the service node that a text session is requested, and complete a text session through the service node. The wireless communication device is configured to receive a first audio message from the calling communication device over the first call, transmit the first audio message to the service node over the second call, receive a first text message from the service node over a third call, and visually display the first text message to the user. In response to receiving a second text message from the user, the wireless communication device transmits a second text message to the service node over the third call, receives a second audio message from the service node over the second call, and transmits the second audio message to the calling communication device over the first call.

DETAILED DESCRIPTION

Figure 1:
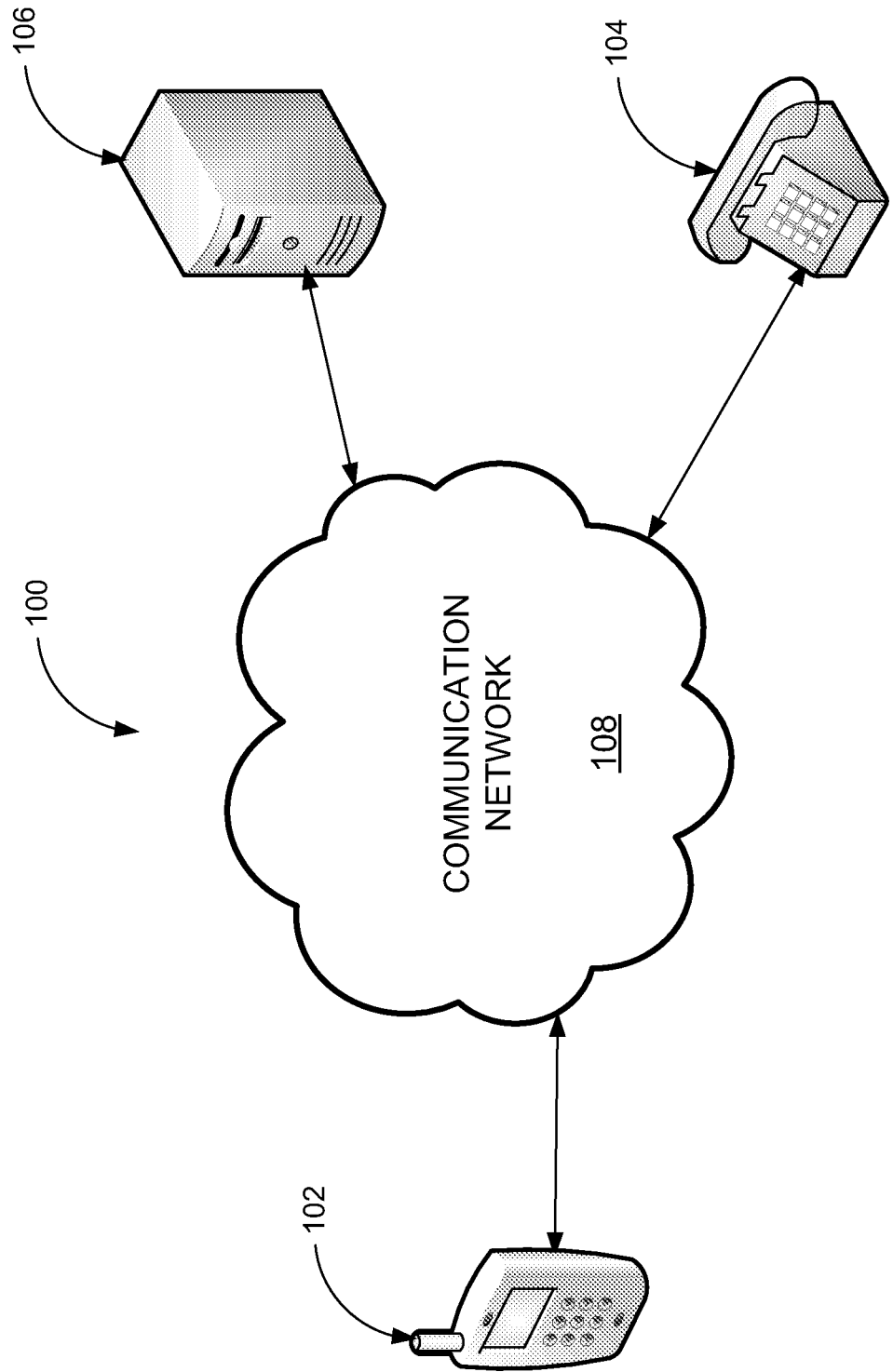
FIG. 1 is a block diagram illustrating a wireless communication system.
Figure 2:
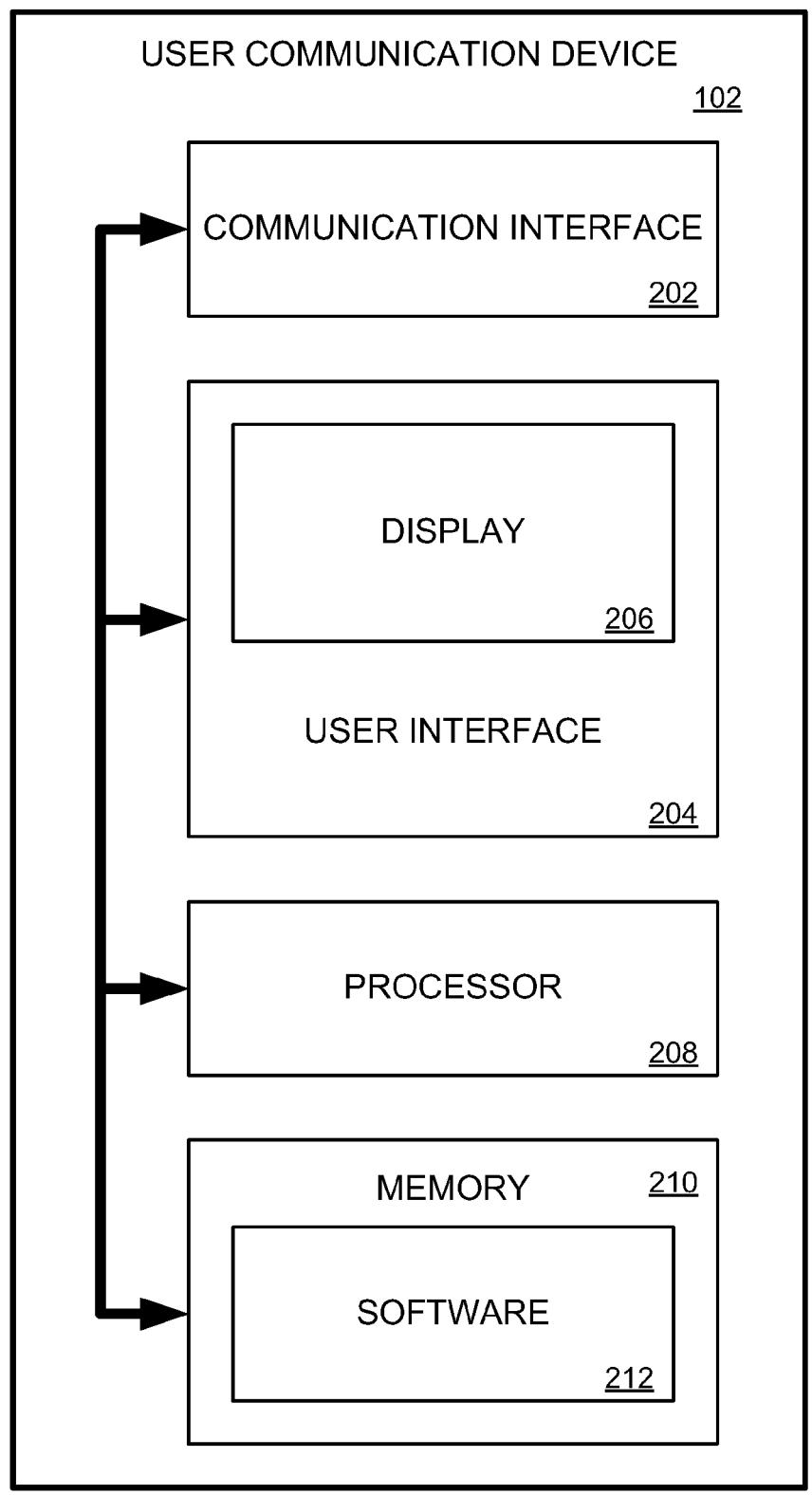
FIG. 2 is a block diagram illustrating a wireless user communication device.

FIG. 1 is a block diagram illustrating a wireless communication system 100. This communication system 100 includes user communication device 102, second communication device 104, and service node 106, all coupled together through a wireless communication network 108. User communication device 102 could be configured to function as a Telecommunication Device for the Deaf (TDD) for use by a hearing impaired person. Although a text/audio wireless communication device interface is also useful in a wide variety of applications other than as an aid for the hearing impaired. User communication device 102 is a wireless device, and is configured to allow a user to initiate text session calls to the second communication device 104 through communication network 108, and to initiate text sessions for calls received from second communication device 104, or other devices. User communication device 102 is illustrated in FIG. 2, and described in detail below. Service node 106 is configured to translate text messages to audio messages, and audio messages to text messages in an audio/text interfacing service. Service node 106 is also configured to handle the call setup operations necessary to enable a text session between user communication device 102 and second communication device 104.

FIG. 2 is a block diagram illustrating user communication device 102. This example user communication device 102 may operate as a Telecommunication Device for the Deaf (TDD), and includes communication interface 202, user interface 204 including display 206, processor 208, and memory 210 containing software 212, all coupled together. Communication interface 202 is a wireless interface configured to interface user communication device 102 to wireless communication network 108 over the air. User interface 204 includes display 206 and any other controls such as switches, keyboards, buttons, sliders, etc. as necessary to allow a user to control device 102 and to receive text messages on display 206. User interface 204 also allows the user to transmit text messages to communication network 108 through communication interface 202. In some embodiments, user interface 204 may include one or more speakers and microphones, allowing device 102 to be used as a normal audio communication device in addition to its capabilities as a text communication device. Processor 208 is configured to control the operation of device 102 as programmed by software 212 in memory 210. Processor 208 may include a microprocessor or other electronic devices configured to control the flow of data between the various components of device 102. Operation of device 102 is illustrated in the call flow diagrams of FIGS. 4 and 5, and the flow diagrams of FIGS. 6 and 8, and described in detail below.

Figure 3:
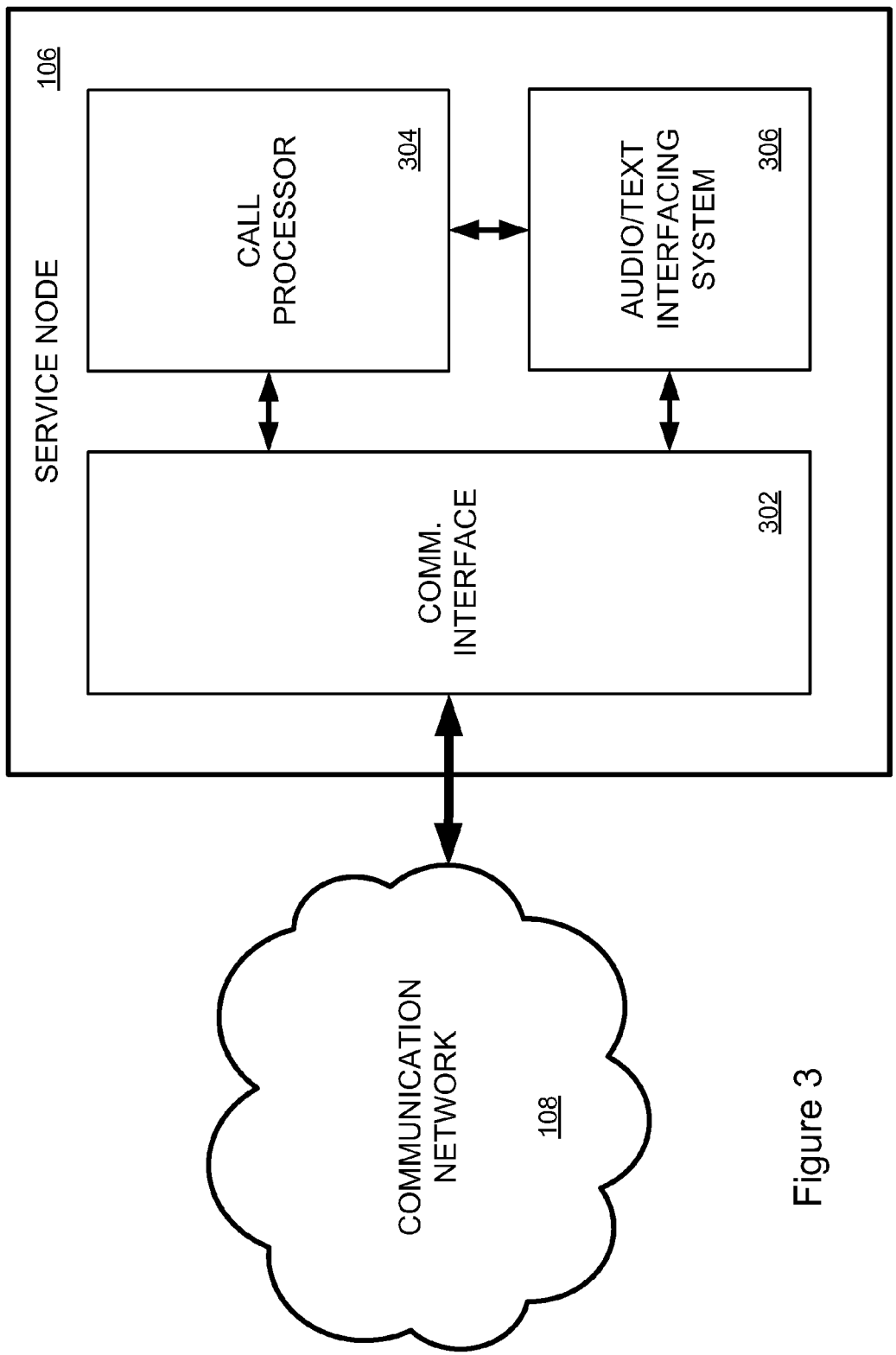
FIG. 3 is a block diagram illustrating a wireless communication system.

FIG. 3 is a block diagram illustrating a communication system 100 including service node 106 functioning as an audio/text interfacing center. In this example, the audio/text interfacing center is coupled to communication network 108 and receives and transmits communications through communication interface 302. Communication interface 302 is coupled with call processor 304 and audio/text interfacing system 306. Call processor 304 is configured to receive, transmit, and setup calls through communication network 108. For example, when a hearing impaired user of user communication system 102 requests a text session to a called number, call processor 304 sets up the call between user communication system 102 and the second communication system 104 represented by the called number. Call processor 304 also configures audio/text interfacing system 306 to translate text messages to audio messages, and audio messages to text messages in the text session. This translation may be performed using any of a wide variety of methods, including having a human operator perform the translation.

Figure 4:
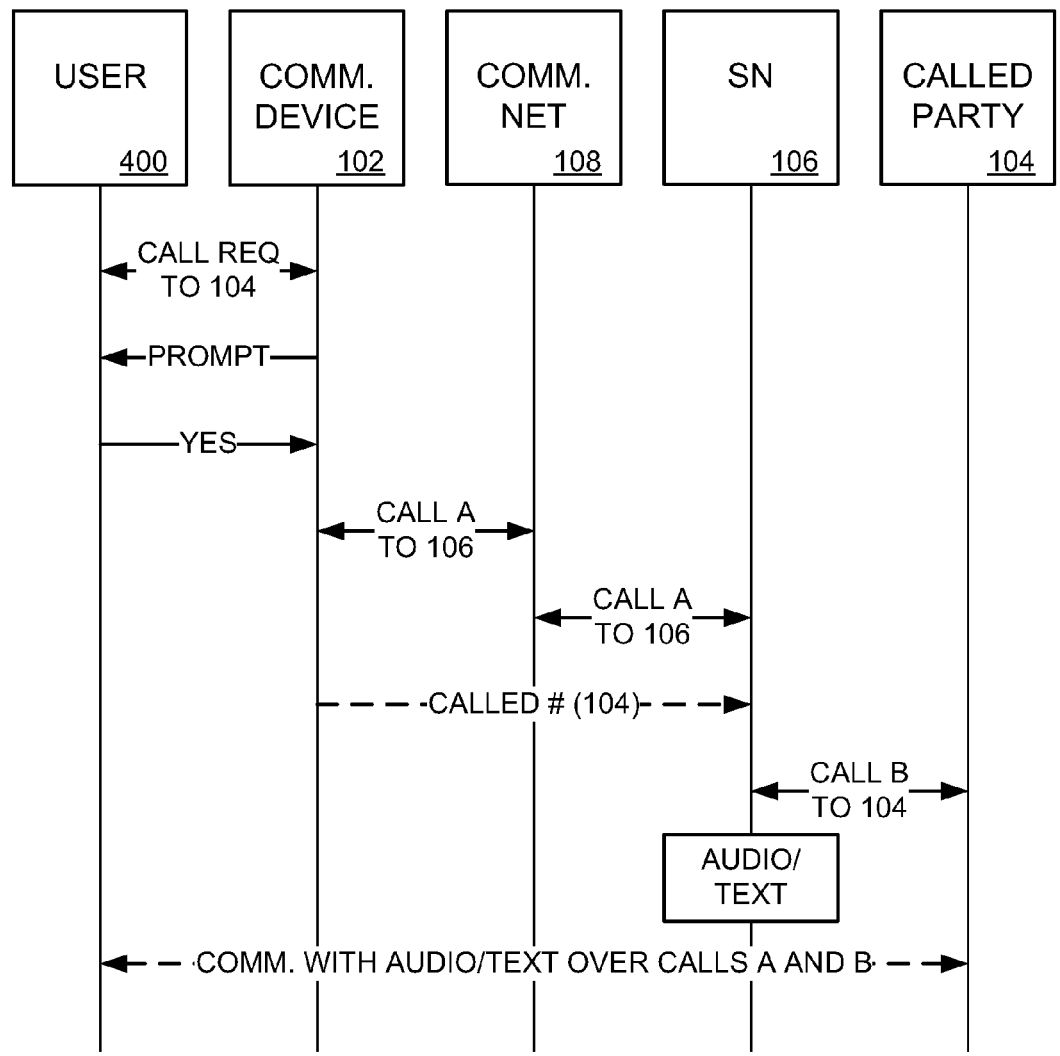
FIG. 4 is a call flow diagram illustrating a method for providing an audio/text interface for a call in a wireless communication system.

FIG. 4 is a call flow diagram illustrating a method for audio/text interfacing a call in wireless communication system 100. This example illustrates the process followed when user 400 of user communication device 102 initiates a text session to called party 104. In this example, user 400 initiates a call request to called party 104 on communication device 102. This call request may be initiated by any of a variety of methods including entering a called number, selecting a contact, or otherwise activating a control on device 102. Device 102 then prompts the user to initiate a text session (instead of a default audio communication session). User 400 then responds in the affirmative to device 102, initiating the text session to called party 104. In response to the request for a text session to called party 104, device 102 uses a number for service node 106 to initiate a first call (illustrated as CALL A) to service node 106 through communication network 108. Note that in response to the user request for a text session, user 400 enters the number for called party 104, while device 102 automatically selects a number for service node 106, and places a call to the service node 106. Device 102 then passes the called number to service node 106. This called number is passed to service node 106 using tone signaling or some other data transfer method. For example, in a VoIP (Voice over Internet Protocol) system, the called number may be sent as a data packet. In response to the request for a text session received from device 102, service node 106 initiates a second call (illustrated as CALL B) to called party 104. Service node 106 then acts as an audio/text interface between the first call from user 400 to service node 106, and the second call from service node 106 to called party 104.

Figure 5:
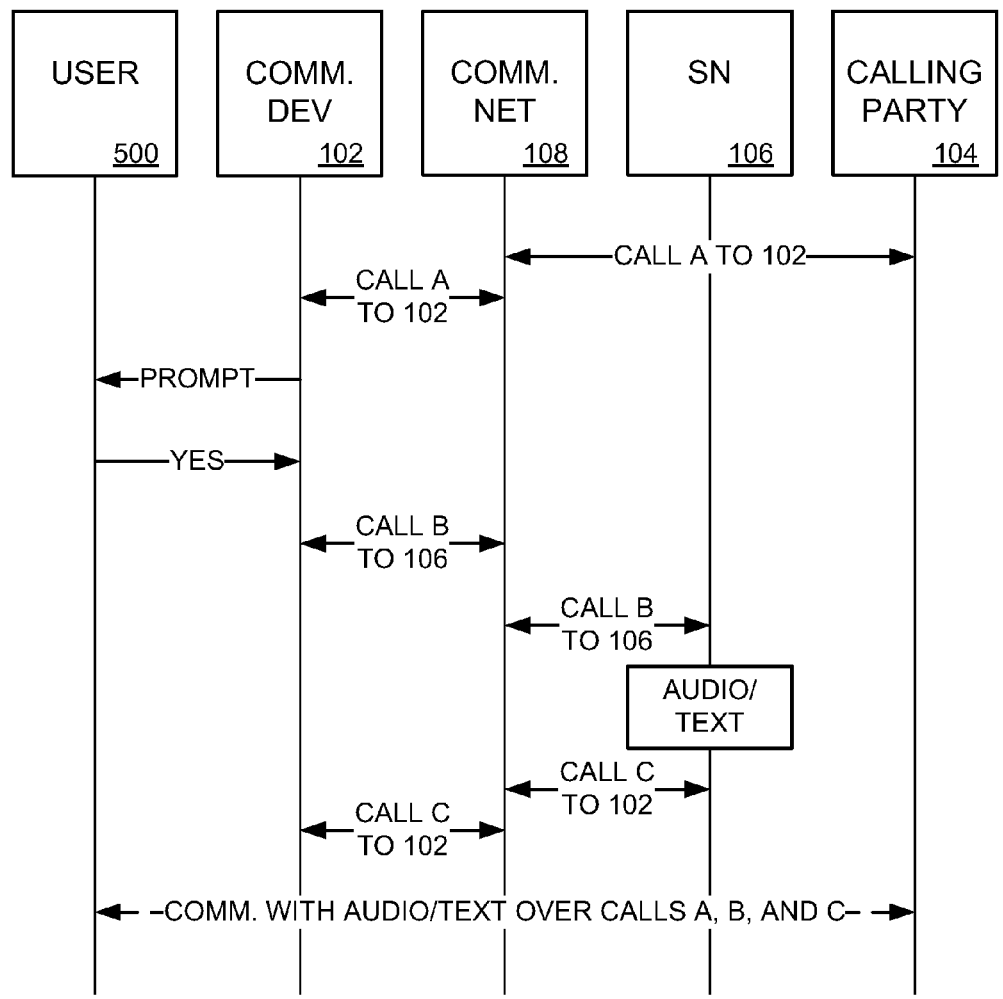
FIG. 5 is a call flow diagram illustrating a method for providing an audio/text interface for a call in a wireless communication system.

FIG. 5 is a call flow diagram illustrating a method for audio/text interfacing a call in wireless communication system 100. This call flow diagram illustrates the process used when user 500 receives a first (voice) call (illustrated as CALL A) from calling party 104 and requests a text session. In this example, calling party 104 initiates a call to user communication device 102 through communication network 108. When user communication device 102 receives the first call, it prompts user 500 to request a text session. This prompting may be performed in any of a wide variety of methods such as vibrating device 102 to alert user 500 of the incoming call and then displaying the prompt on display 206. In response to a request for a text session from user 500, device 102 initiates a second call (illustrated as CALL B) to service node 106 through communication network 108 requesting a text session. When service node 106 receives the text session request from device 102, it initiates a third call (illustrated as CALL C) back to device 102. Device 102 is configured to receive audio messages from calling party 104 over the first call, and then forward these audio messages to service node 106 over the second call. Service node 106 then translates these audio messages into text messages and transmits the text messages to device 102 over the third call. Device 102 then displays the translated text messages to user 500 on display 206. Likewise, when user 500 enters a text message responding to calling party 104, device 102 transmits the text message from user 500 to service node 106 over the third call. Service node 106 then translates this text message into an audio message and transmits the audio translation back to device 102 over the second call. Finally, device 102 transmits the audio message to calling party 104.

While this example uses three separate calls between user device 102, service node 106, and calling party 104, other examples may combine the second and third calls into a single call transferring both audio messages and text messages between user device 102 and service node 106. In other words, the third call may be performed as a series of text messages within the second call.

Figure 6:
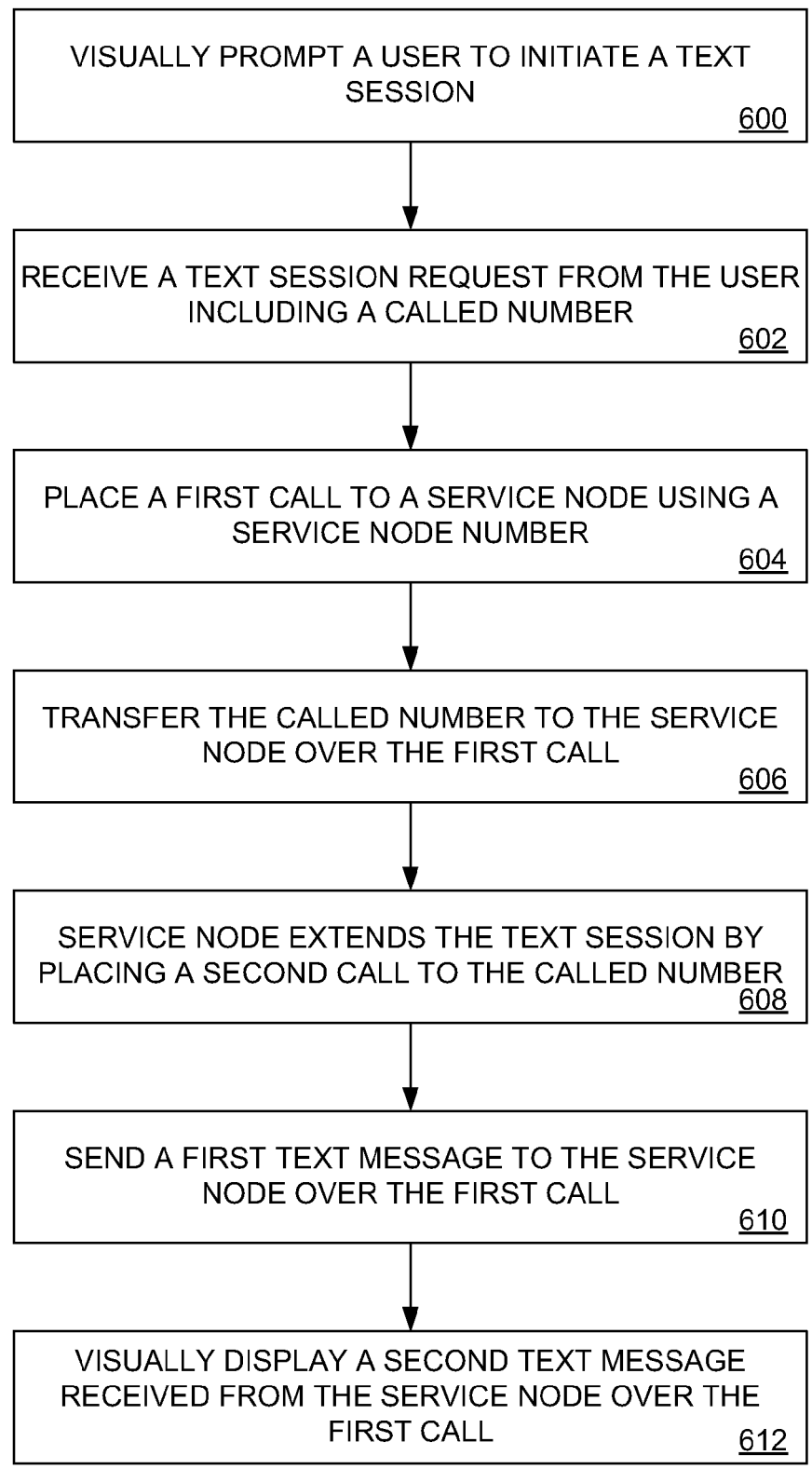
FIG. 6 is a flow diagram illustrating a method for providing an audio/text interface for a call in a user communication device within a wireless communication system.
Figure 7:
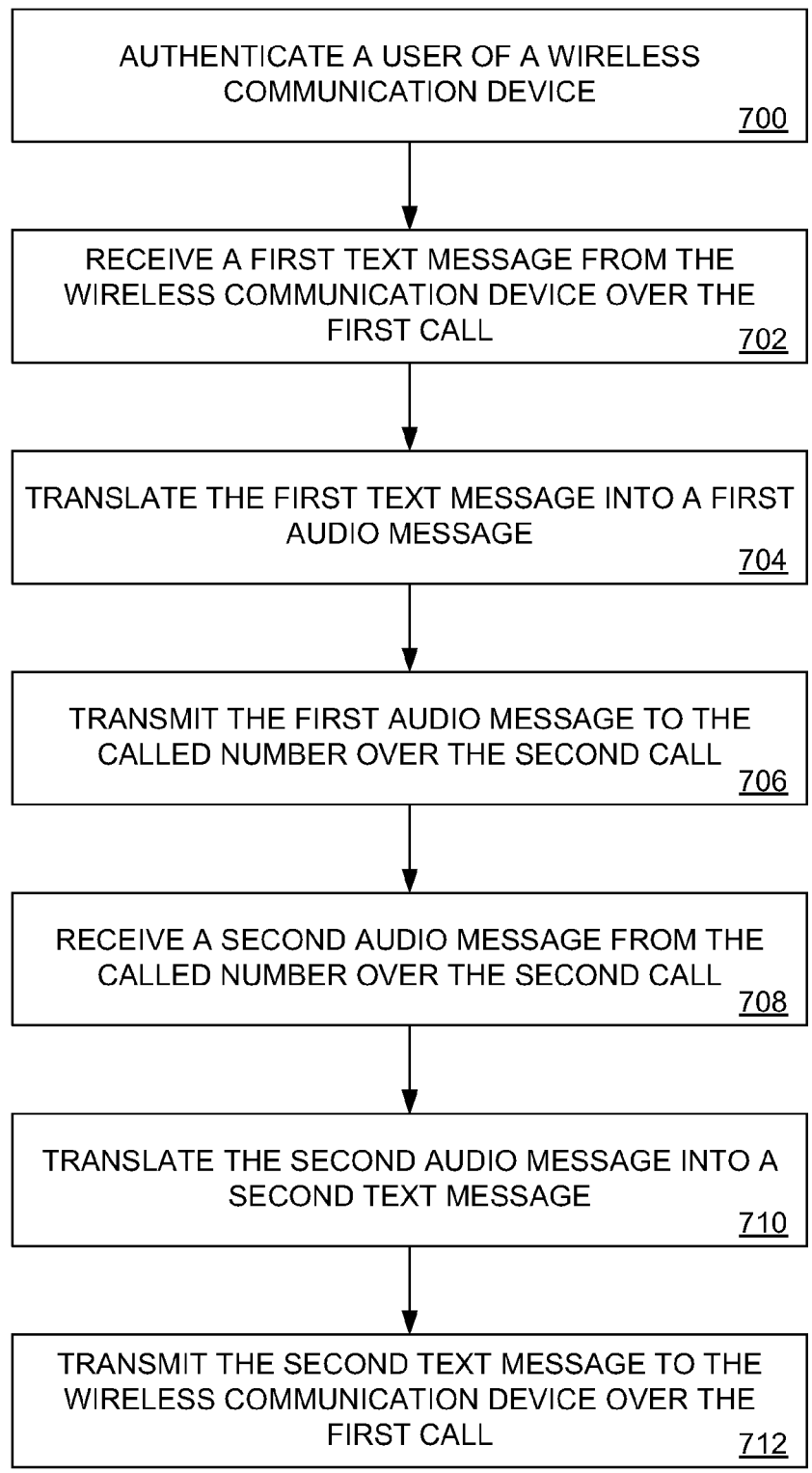
FIG. 7 is a flow diagram illustrating a method for providing an audio/text interface for a call in a service node within a wireless communication system.

FIG. 6 is a flow diagram illustrating a method for captioning a call in user communication device 102 within wireless communication system 100. Reference numbers from FIG. 6 are indicated parenthetically below. This flow diagram illustrates one example method used by user communication device 102 when user 400 initiates a text session to called party 104. This method corresponds to the call flow diagram of FIG. 4. User communication device 102 visually prompts user 400 to initiate a text session, (operation 600). When user 400 affirmatively requests a text session, device 102 also receives a called number from the user, (operation 602). In response to the text session request, device 102 places a first call to service node 106 using a service node number, (operation 604). Method steps performed by service node 106 are illustrated in FIG. 7 and described below. Device 102 then transfers the called number to service node 106 over the first call, (operation 606). Service node 106 extends the text session by placing a second call to called party 104 (operation 608). Device 102 sends a first text message to service node 106 over the first call, (operation 610). Device 102 then receives a second text message from service node 106 and displays the message to user 400, (operation 612).

FIG. 7 is a flow diagram illustrating a method for audio/text interfacing a call in service node 106 within wireless communication system 100. Reference numbers from FIG. 7 are indicated parenthetically below. This flow diagram illustrates one example method used by service node 106 when user 400 initiates a text session to called party 104. This method corresponds to the call flow diagram of FIG. 4, and in this example, service node 106 is acting as the audio/text interfacing center illustrated in FIG. 3. Service node 106 optionally authenticates user 400 of communication device 102 to ensure user 400 is to be allowed to initiate text sessions, (operation 700). This authentication may use any of a variety of methods, such as examining the user's calling number, or account number. When a text session has been initiated, service node 106 receives a first text message from the user's wireless communication device 102 over the first call, (operation 702). Service node 106 translates the first text message into a first audio message, (operation 704), and then transmits the first audio message to the called number over the second call, (operation 706). When service node 106 receives a second audio message from the called number over the second call, (operation 708), it translates the second audio message into a second text message, (operation 710), and then transmits the second text message to the user's wireless communication device over the first call, (operation 712).

Figure 8:
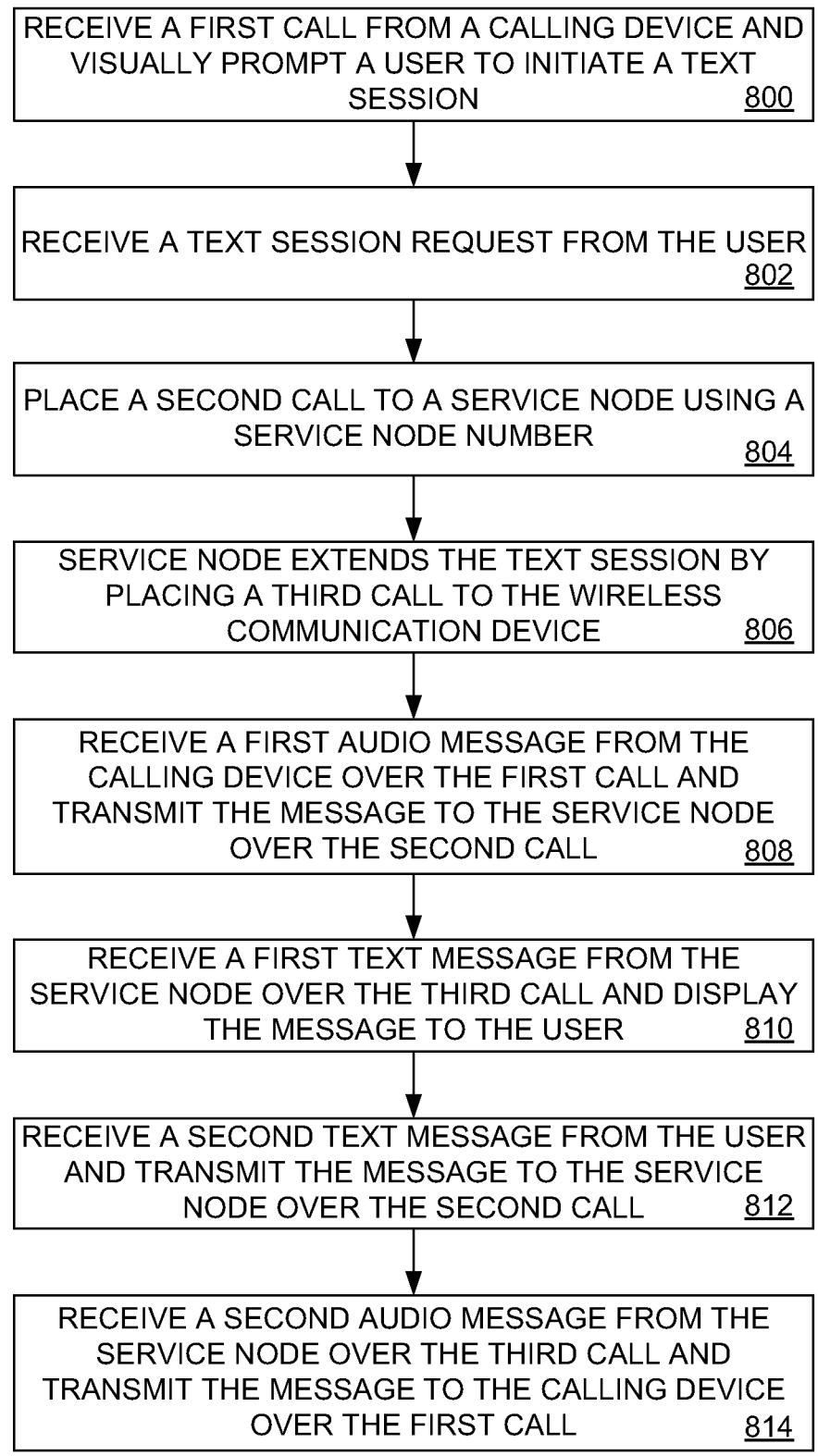
FIG. 8 is a flow diagram illustrating a method for providing an audio/text interface for a call in a user communication device within a wireless communication system.
Figure 9:
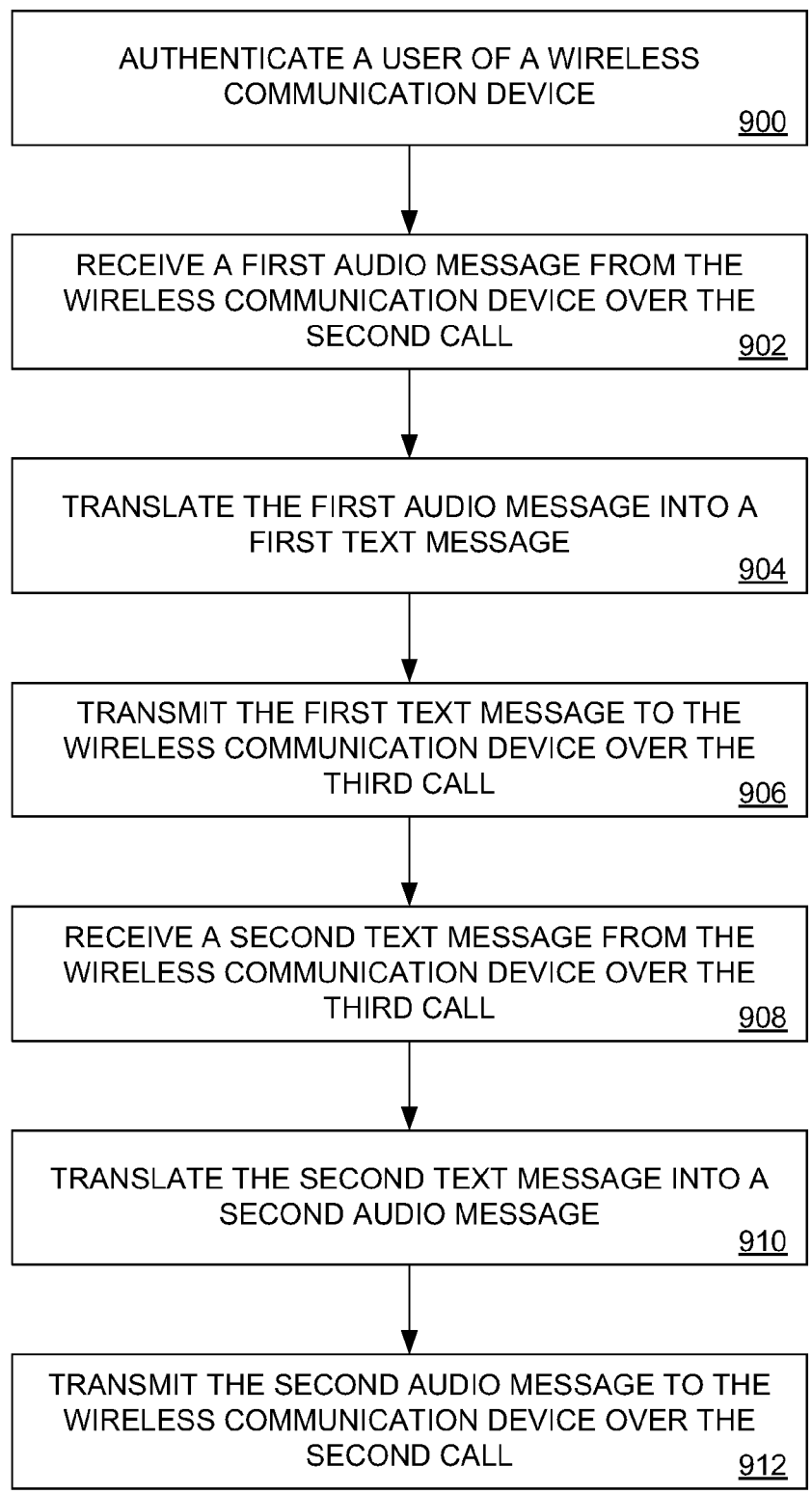
FIG. 9 is a flow diagram illustrating a method for providing an audio/text interface for a call in a service node within a wireless communication system.

FIG. 8 is a flow diagram illustrating a method for captioning a call in user communication device 102 within wireless communication system 100. Reference numbers from FIG. 8 are indicated parenthetically below. This flow diagram illustrates one example method used by user communication device 102 when user 500 initiates a text session in response to a call from calling party 104. This method corresponds to the call flow diagram of FIG. 5. In response to receiving a first (voice) call from calling party 104, device 102 visually prompts user 500 to initiate a text session, (operation 800). When user 500 responds with a text session request, (operation 802), device 102 places a second call to service node 106 using a service node number, (operation 804). Service node 106 then extends the text session by placing a third call to user communication device 102, (operation 806). Device 102 receives a first audio message from the calling device and transmits the audio message to service node 106 over the second call, (operation 808). Method steps performed by service node 106 are illustrated in FIG. 9 and described below. Device 102 then receives a first text message from service node 106 over the third call and displays this text message to user 500, (operation 810). In response to receiving a second text message from user 500, device 102 transmits the second text message to service node 106 over the third call, (operation 812). Device 102 then receives a second audio message from service node 106 over the second call and transmits the second audio message to calling device 104 over the first (voice) call, (operation 814).

FIG. 9 is a flow diagram illustrating a method for captioning a call in service node 106 within wireless communication system 100. Reference numbers from FIG. 9 are indicated parenthetically below. This flow diagram illustrates one example method used by service node 106 when user 500 initiates a text session in response to a call from calling party 104. This method corresponds to the call flow diagram of FIG. 5, and in this example, service node 106 is acting as the audio/text interfacing center illustrated in FIG. 3. Service node 106 optionally authenticates user 500 of communication device 102 to ensure user 500 is to be allowed to initiate text sessions, (operation 900). This authentication may use any of a variety of methods, such as examining the user's calling number, or account number. When a text session has been initiated, service node 106 receives a first audio message from the user's wireless communication device 102 over the second call, (operation 902). Service node 106 translates the first audio message into a first text message, (operation 904), and then transmits the first text message to the user's wireless communication device 102 over the third call, (operation 906). When service node 106 receives a second text message from device 102 over the third call, (operation 908), it translates the second text message into a second audio message, (operation 910), and then transmits the second audio message to the user's wireless communication device 102 over the second call, (operation 912).

Figure 10:
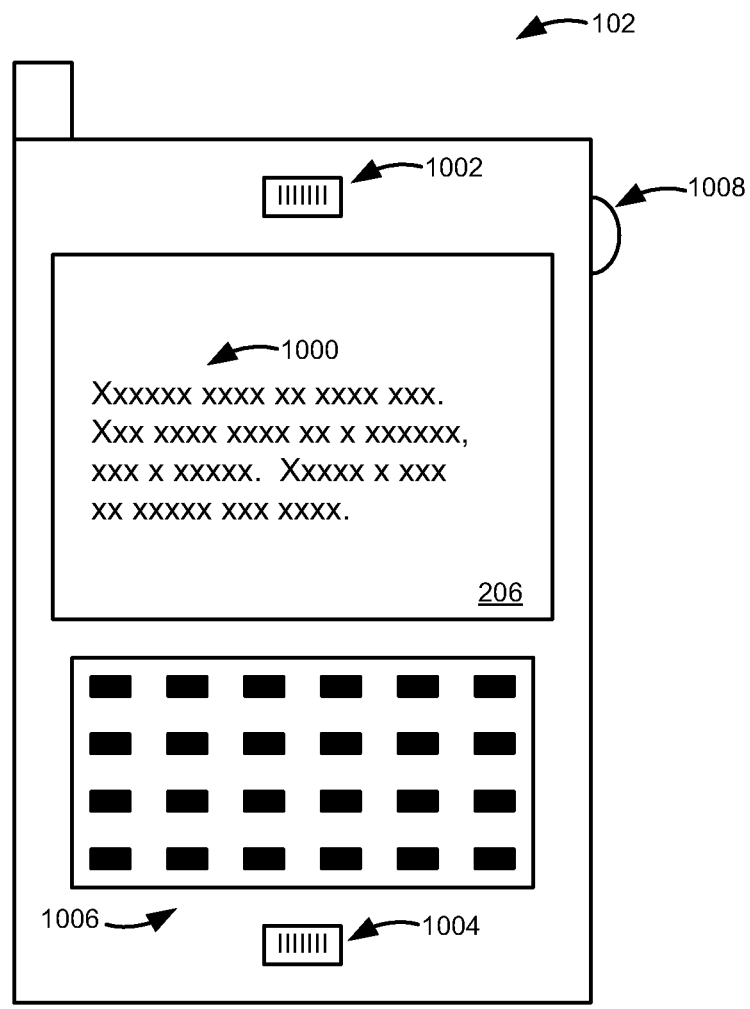
FIG. 10 is a block diagram illustrating a computer system.

FIG. 10 is a block diagram that illustrates user communication device 102. Wireless communication device 102 illustrates a number of user interface devices 204 including display 206 containing text message 1000, keypad 1006, and control switch 1008. This example device 102 also includes speaker 1002 and microphone 1004 for use as an audio device. As illustrated in FIGS. 1 through 5, and described above, device 102 is configured to operate in both audio and text messaging mode according to the needs of a user.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for operating a wireless communication device, comprising:
visually prompting a user to initiate a text session and receiving a text session request from the user including a called number;
in response to the text session request, initiating the text session by placing a first call to a service node using a service node number, and transferring the called number to the service node over the first call, wherein the service node extends the text session by placing a second call to the called number;

sending a first text message to the service node over the first call;
receiving a second text message from the service node over the first call; and
visually displaying the second text message to the user;
wherein the service node is configured to:
receive the first text message from the wireless communication device over the first call,
translate the first text message to a first audio message,
transmit the first audio message to the called number over the second call,
receive a second audio message from the called number over the second call,
translate the second audio message to the second text message, and
transmit the second text message to the wireless communication device over the first call.

2. The method of claim 1, further comprising:
authenticating the user; and
transmitting the authentication to the service node.

3. The method of claim 2, wherein authenticating the user includes receiving an account number from the user.

4. The method of claim 1, wherein the wireless communication device is a Telecommunication Device for the Deaf (TDD).

5. A method for operating a wireless communication device, comprising:
receiving a first call from a calling communication device, visually prompting a user to request a text session, and receiving a text session request from the user;
in response to the text session request from the user, initiating the text session by placing a second call to a service node using a service node number, wherein the service node extends the text session by placing a third call to the wireless communication device;
receiving a first audio message from the calling communication device over the first call;
transmitting the first audio message to the service node over the second call;
receiving a first text message from the service node over the third call;
visually displaying the first text message to the user;
receiving a second text message from the user;
transmitting a second text message to the service node over the third call;
receiving a second audio message from the service node over the second call; and
transmitting the second audio message to the calling communication device over the first call.

6. The method of claim 5, wherein the service node is configured to:
receive a first audio message from the wireless communication device over the second call;
translate the first audio message to a first text message;
transmit the first text message to the wireless communication device over the third call;
receive a second text message from the wireless communication device over the third call;
translate the second text message to a second audio message; and
transmit the second audio message to the wireless communication device over the second call.

7. The method of claim 5, further comprising:
authenticating the user; and
transmitting the authentication to the service node.

8. The method of claim 7, wherein authenticating the user includes receiving an account number from the user.

9. The method of claim 5, wherein the wireless communication device is a Telecommunication Device for the Deaf (TDD).

10. A wireless communication device, comprising:
a communication interface, configured to wirelessly couple the wireless communication device to a communication network including a service node;
a user interface, including a display; and
a processor coupled to the communication interface and the user interface;
wherein the display is configured to visually prompt a user to request a text session;
wherein the user interface is configured to receive a request for a text session and a called number from the user, and output the request for a text session and the called number to the processor; and
wherein the processor is configured to:
connect to a service node through the communication interface in a first call;
signal the service node that a text session is requested;
transmit the called number to the service node through the communication interface over the first call; and
complete a text session to the called number through the service node, including:
sending a first text message to the service node over the first call;
receiving a second text message from the service node over the first call; and
visually displaying the second text message to the user;
wherein the service node is configured to:
receive the first text message from the wireless communication device over the first call;
translate the first text message to a first audio message;
transmit the first audio message to the called number in a second call;
receive a second audio message from the called number over the second call;
translate the second audio message to the second text message; and
transmit the second text message to the wireless communication device over the first call.

11. The wireless communication device of claim 10, wherein the processor is further configured to authenticate the user, and transmit the authentication to the service node through the communication interface.

12. The wireless communication device of claim 11, wherein authenticating the user includes receiving an account number from the user.

13. The wireless communication device of claim 10, wherein the wireless communication device is a Telecommunication Device for the Deaf (TDD).

14. A wireless communication device, comprising:
a communication interface, configured to wirelessly couple the wireless communication device to a communication network including a service node;
a user interface, including a display; and
a processor coupled to the communication interface and the user interface; and
wherein the communication interface is also configured to receive a first call from a calling communication device;
wherein the display is configured to notify a user that a first call is waiting, and visually prompt a user to request a text session;
wherein the user interface is configured to receive a request for a text session from the user, and output the request for a text session to the processor; and wherein the processor is configured to:
- select a service node within the communication network;
- connect to the service node through the communication interface in a second call;
- signal the service node that a text session is requested; and
- complete a text session through the service node, including:
  - receiving a first audio message from the calling communication device over the first call;
  - transmitting the first audio message to the service node over the second call;
  - receiving a first text message from the service node over a third call;
  - visually displaying the first text message to the user;
  - receiving a second text message from the user;
  - transmitting a second text message to the service node over the third call;
  - receiving a second audio message from the service node over the second call; and
  - transmitting the second audio message to the calling communication device over the first call.

15. The wireless communication device of claim 14, wherein the service node is configured to:
- receive a first audio message from the wireless communication device over the second call;
- translate the first audio message to a first text message;
- transmit the first text message to the wireless communication device over the third call;
- receive a second text message from the wireless communication device over the third call;
- translate the second text message to a second audio message; and
- transmit the second audio message to the wireless communication device over the second call.

16. The wireless communication device of claim 14, wherein the processor is further configured to authenticate the user, and transmit the authentication to the service node through the communication interface.

17. The wireless communication device of claim 16, wherein authenticating the user includes receiving an account number from the user.

18. The wireless communication device of claim 14, wherein the wireless communication device is a Telecommunication Device for the Deaf (TDD).

19. A communication system, comprising:
a communication network; and
a service node within the communication network;
wherein the service node is configured to:
- receive a text session request including a called number from a wireless communication device in a first call;
- extend the text session by placing a second call to the called number;
- receive a first text message from the wireless communication device over the first call;
- translate the first text message to a first audio message;
- transmit the first audio message to the called number over the second call;
- receive a second audio message from the called number over the second call;
- translate the second audio message to a second text message; and
- transmit the second text message to the wireless communication device over the first call; and wherein the service node is also configured to:
- receive a text session request from the wireless communication device in a third call;
- extend the text session by placing a fourth call to the wireless communication device;
- receive a first audio message from the wireless communication device over the third call;
- translate the first audio message to a first text message;
- transmit the first text message to the wireless communication device over the fourth call;
- receive a second text message from the wireless communication device over the fourth call;
- translate the second text message to a second audio message; and
- transmit the second audio message to the wireless communication device over the third call.

20. The communication system of claim 19, wherein the service node is also configured to authenticate a user of the wireless communication device.

21. The communication system of claim 20, wherein authenticating the user includes receiving an account number from the user.

22. The method of claim 19, wherein the wireless communication device is a Telecommunication Device for the Deaf (TDD).

* * * * *